UNITED STATES PATENT OFFICE.

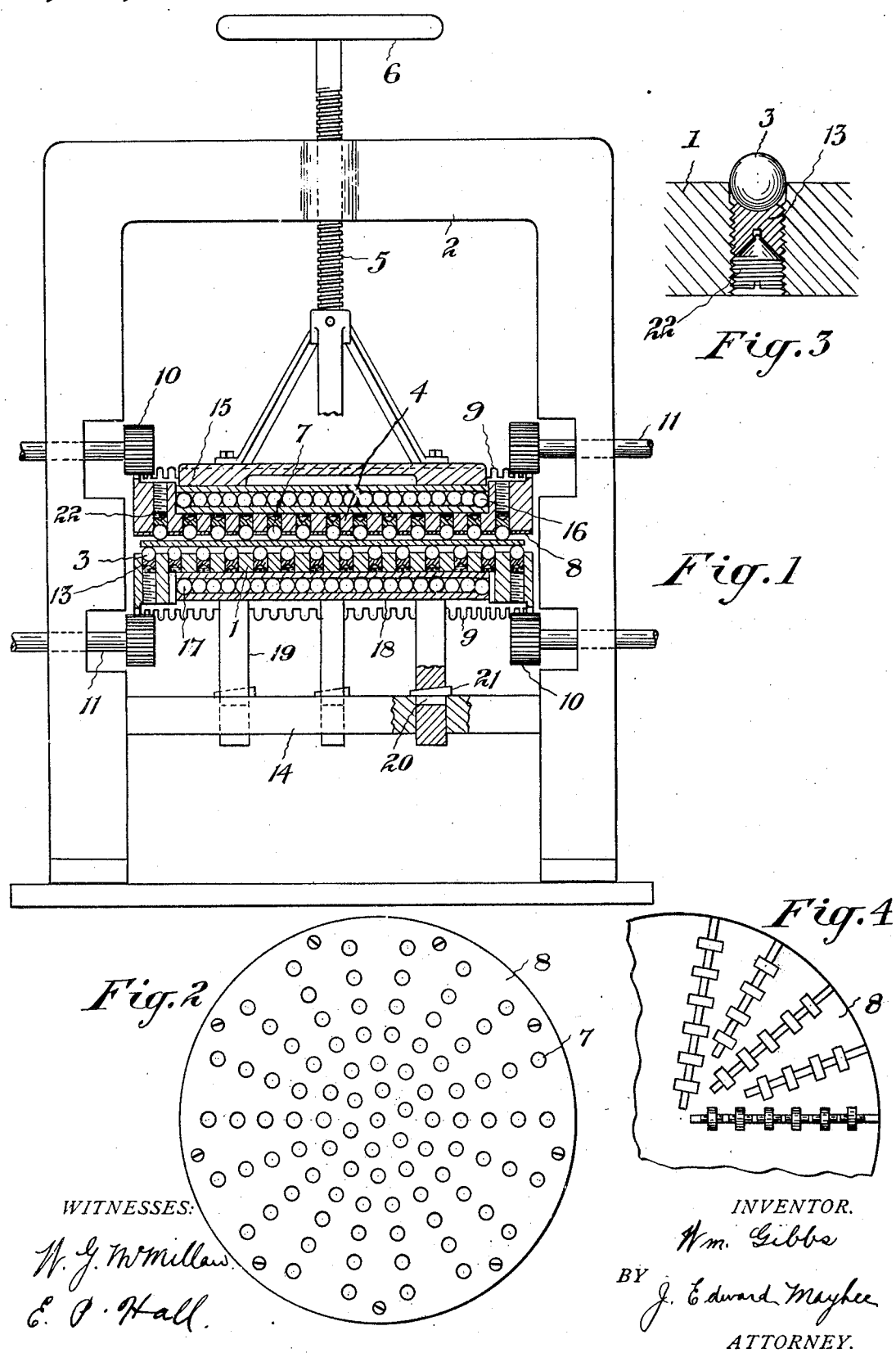

WILLIAM GIBBS, OF BRANTFORD, ONTARIO, CANADA, ASSIGNOR OF ONE-HALF TO PERCY E. VERITY, OF BRANTFORD, ONTARIO, CANADA.

DISK STRAIGHTENING AND TRUING APPARATUS.

1,058,856.

Specification of Letters Patent.

Patented Apr. 15, 1913.

Application filed July 18, 1912. Serial No. 710,235.

*To all whom it may concern:*

Be it known that I, WILLIAM GIBBS, a subject of the King of Great Britain, and a resident of the city of Brantford, in the county of Brant, in the Province of Ontario, Canada, have invented certain new and useful Improvements in Disk Straightening and Truing Apparatus, of which the following is a specification.

This invention relates to apparatus for straightening and truing round plates or disks such as commonly used in seed drills, plows, or as saws, and my object is to devise a machine which will so accurately straighten and true a disk as to eliminate entirely the necessity for employing hand work as is now generally done.

I attain my object by means of apparatus in which the disks are treated between upper and lower plates carrying concentric series of contact pieces such as balls, the upper series of balls "breaking joint" or having a staggered relationship with the lower series as shown. Either the upper or lower or both plates are rotated and at the same time heavy pressure is brought to bear to press the balls against the faces of the disk substantially as hereinafter more particularly described and illustrated in the accompanying drawings.

Figure 1 is a front elevation partly in section of my improved apparatus. Fig. 2 is a plan view of the under side of the head carrying the upper series of adjustable balls. Fig. 3 is a detail of a ball adjustment. Fig. 4 is a detail in plan of a roller used as a substitute for a ball.

In the drawings, like numerals of reference indicate corresponding parts in the different figures.

14 is the base to which is connected the yoke 2. On the base is supported a plate 1. In suitable individual bearings in the plate are supported a series of contact pieces 3 preferably rotatable on axes radial of the plate. These contact pieces will usually be steel balls preferably arranged in plan in substantially the same manner as the balls shown in Fig. 2.

4 is a movable plate or head concentric with the plate 1, and to which is connected the screw spindle 5, the connection between the spindle and the head being such that the latter may revolve freely. The spindle 5 is screwed through the yoke 2 and is provided at its upper end with a hand wheel 6. As a preferred construction the spindle 5 is firmly secured to the plate 15 between which and the head 4 are located the ball bearings 16.

The plate 4 supports in suitable individual bearings a series of balls 7 which are preferably arranged as shown in Fig. 1 in staggered relationship with the lower balls. These balls are held in place by means of a retainer 8.

On the outer faces of the plates 1 and 4 are formed the circular racks 9 with which mesh the pinions 10 fast on the spindles 11 journaled in the yoke 2.

The spindles may be slid longitudinally in their bearings to withdraw the pinions 10 from mesh when it is necessary to raise the plate 4 or lower the plate 1, though any other arrangement might be employed for the purpose.

The disks are straightened by inserting them between the upper and lower plates. The upper plate is then forced down by rotating the screw spindle and at the same time one or both plates are rotated by operating the spindles 11 by any suitable means. The disk is thus rolled between the balls. The pressure of the balls is so distributed as to effectively straighten out any kinks or inequalities in the disk.

It is preferable to support the lower plate 1 on ball bearings. I, therefore, provide ball bearings 17 between the underside of the plate 1 and a bearing plate 18. This bearing plate is supported by posts 19 which are slidable, carried in holes in the base 14. The posts are provided with slots 20, through which wedges 21 are driven engaging the upper side of the base. By driving out these wedges the plate 18 may be allowed to drop away to expose the bearing adjustments for the balls 3.

On reference to Fig. 3 it will be seen that each ball 3 or 7 rests on a cupped screw 13 screwed in one of the plates 1 or 4, and that a lock screw 22 is screwed into the same hole. This enables me to separately adjust each ball perpendicular to its plate so that each ball may be given exactly the right bearing on the disk being operated on.

As a substitute for balls, rollers radially journaled as shown in Fig. 4, may be substituted with some success, though the balls are preferable as, while it is essential that the contact pieces shall rotate freely on radial axes, the freedom of the balls to rotate on any axis is an added advantage and their use reduces the cost of construction.

It will be understood, of course, that I do not desire to restrict myself to the exact construction shown, as many other arrangements might be provided for pressing the disks between two series of balls, one or both of which may be rotated to roll out any inequalities in the disk.

What I claim as my invention is:—

1. In disk straightening apparatus, the combination of two parallel plates relatively rotatable and axially movable; and contact pieces carried by each of said plates on their adjacent faces rotatable on axes radial of the plates.

2. In disk straightening apparatus, the combination of two parallel plates relatively rotatable and axially movable; and contact pieces carried by said plates on their adjacent faces rotatable on axes radial of the plates, the contact pieces of one disk having a staggered relationship with those of the other.

3. In disk straightening apparatus the combination of two parallel plates relatively rotatable and axially movable; and contact pieces carried by each of said plates on their adjacent faces rotatable on axes radial of the plates, the said contact pieces being arranged in concentric series.

4. In disk straightening apparatus, the combination of two parallel plates relatively rotatable and axially movable; and contact pieces carried by said plates on their adjacent faces rotatable on axes radial of the plates, the said contact pieces being arranged in concentric series, the series of contact pieces of one plate having a staggered relationship to the series of the other plate.

5. In disk straightening apparatus the combination of two parallel plates relatively rotatable and axially movable; and contact pieces carried by said plates on their adjacent faces rotatable on axes radial of the plates and means for individually adjusting said contact pieces in a direction perpendicular to the surfaces of the plates.

6. In disk straightening apparatus the combination of a plate suitably supported; a second plate parallel to and concentric with the first; means for moving said second plate to and from the first plate, one of the said plates being rotatable; means for rotating said plate; and contact pieces carried by each of said plates on their adjacent faces rotatable on axes radial of the plates.

7. In disk straightening apparatus the combination of two parallel plates relatively rotatable and axially movable; and a plurality of balls carried by each of said plates on their adjacent faces each in an independent bearing.

8. In disk straightening apparatus the combination of two parallel plates relatively rotatable and axially movable; a plurality of balls carried by said plates on their adjacent faces, each in an independent bearing, and means for independently adjusting each bearing axially of the plates.

9. In disk straightening apparatus the combination of two parallel plates relatively rotatable and axially movable; a plurality of balls carried by said plates on their adjacent faces, each in an independent bearing, and means for independently adjusting each bearing axially of the plates, the said balls being arranged in concentric series, so the series of one plate having a staggered relationship with the series of the other plate.

Brantford, Ont., this 4th day of July, 1912.

WILLIAM GIBBS.

Signed in the presence of—
KATHLEEN GRADY,
S. P. PITCHER.